(12) United States Patent
Bartlett et al.

(10) Patent No.: US 11,557,989 B2
(45) Date of Patent: Jan. 17, 2023

(54) VOLTAGE-BASED BRAKING METHODOLOGY FOR A POWER TOOL

(71) Applicant: MILWAUKEE ELECTRIC TOOL CORPORATION, Brookfield, WI (US)

(72) Inventors: Timothy J. Bartlett, Waukesha, WI (US); Zachary J. Evans, Waukesha, WI (US); Jacob R. McDonald, Ixonia, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 0 days.

(21) Appl. No.: 17/342,879

(22) Filed: Jun. 9, 2021

(65) Prior Publication Data

US 2021/0391811 A1 Dec. 16, 2021

Related U.S. Application Data

(60) Provisional application No. 63/037,731, filed on Jun. 11, 2020.

(51) Int. Cl.
*H02P 3/18* (2006.01)
*H02P 27/06* (2006.01)
(Continued)

(52) U.S. Cl.
CPC ............... *H02P 3/18* (2013.01); *H02P 27/06* (2013.01)

(58) Field of Classification Search
CPC ...... H02P 3/22; H02P 3/18; H02P 6/16; H02P 27/06
See application file for complete search history.

(56) References Cited

U.S. PATENT DOCUMENTS

| 4,857,814 A | 8/1989 | Duncan |
| 5,014,793 A | 5/1991 | Germanton et al. |

(Continued)

FOREIGN PATENT DOCUMENTS

| CN | 111226626 A | * | 6/2020 | ............ A01G 3/086 |
| DE | 19636873 A1 | | 3/1998 | |

(Continued)

OTHER PUBLICATIONS

International Search Report and Written Opinion for Application No. PCT/US2021/036553 dated Sep. 28, 2021 (9 pages).

*Primary Examiner* — Thai T Dinh
(74) *Attorney, Agent, or Firm* — Michael Best & Friedrich LLP

(57) ABSTRACT

Braking a power tool motor based on a phase voltage of the motor. The power tool includes a motor and a power source providing operating power to the motor. A power switching network is between the power source and the motor to drive the motor. An actuator is operable to provide an input. An electronic controller is connected to the actuator and the power switching network. The electronic controller is configured to receive an indication related to initiating braking of the motor, control the power switching network to allow the motor to coast, monitor a phase voltage of the motor, determine whether the phase voltage of the motor is equal to or less than a phase voltage threshold, and control, in response to the phase voltage of the motor being equal to or less than the phase voltage threshold, the power switching network to brake the motor.

20 Claims, 7 Drawing Sheets

(51) Int. Cl.
*H02P 3/22* (2006.01)
*H02P 6/16* (2016.01)

(56) References Cited

U.S. PATENT DOCUMENTS

| | | |
|---|---|---|
| 5,136,220 A | 8/1992 | Philipp |
| 5,440,215 A | 8/1995 | Gilmore |
| 5,480,009 A | 1/1996 | Wieland et al. |
| 5,568,031 A | 10/1996 | Jinbo et al. |
| 5,738,177 A | 4/1998 | Schell et al. |
| 5,747,953 A | 5/1998 | Philipp |
| 5,813,123 A | 9/1998 | Wieland et al. |
| 6,025,683 A | 2/2000 | Philipp |
| 6,104,155 A | 8/2000 | Rosa |
| 6,236,177 B1 | 5/2001 | Zick et al. |
| 6,392,373 B1 | 5/2002 | Glasgow et al. |
| 6,831,432 B2 | 12/2004 | Murakami |
| 7,174,973 B1 | 2/2007 | Lysaght |
| 7,513,402 B2 | 4/2009 | Miyashita et al. |
| 7,551,411 B2 | 6/2009 | Woods et al. |
| 8,555,999 B2 | 10/2013 | McRoberts et al. |
| 8,587,231 B2 | 11/2013 | Pant |
| 9,193,055 B2 * | 11/2015 | Lim .................. B25F 5/001 |
| 9,352,456 B2 * | 5/2016 | Murthy .................. B25B 23/14 |
| 9,614,466 B2 | 4/2017 | Usselman et al. |
| 10,011,006 B2 | 7/2018 | Sergyeyenko et al. |
| 10,158,301 B2 | 12/2018 | Manasseh et al. |
| 10,177,691 B2 | 1/2019 | Eshleman et al. |
| 10,427,282 B2 * | 10/2019 | Ishikawa ............. B25B 23/1475 |
| 10,589,413 B2 | 3/2020 | Goble |
| 10,603,777 B2 | 3/2020 | Palich et al. |
| 10,637,372 B2 | 4/2020 | Larsen et al. |
| 10,666,168 B2 | 5/2020 | Takeda |
| 2008/0021590 A1 | 1/2008 | Vanko et al. |
| 2009/0165615 A1 | 7/2009 | Nishimiya et al. |
| 2012/0013278 A1 | 1/2012 | Hanlon et al. |
| 2012/0074881 A1 * | 3/2012 | Pant ......................... B25F 5/00 318/400.09 |
| 2012/0279743 A1 | 11/2012 | Suda et al. |
| 2014/0001224 A1 | 1/2014 | McNeill et al. |
| 2016/0121467 A1 | 5/2016 | Ng et al. |
| 2017/0120435 A1 | 5/2017 | Palich et al. |
| 2017/0234484 A1 | 8/2017 | Vanko et al. |
| 2017/0264219 A1 | 9/2017 | Takeda |
| 2017/0288583 A1 | 10/2017 | Ma et al. |
| 2017/0288584 A1 | 10/2017 | Ma et al. |
| 2017/0366118 A1 * | 12/2017 | Gyoten .................. H02M 1/08 |
| 2018/0015603 A1 | 1/2018 | Abe et al. |
| 2019/0084107 A1 * | 3/2019 | Yabuguchi ............... B25F 5/001 |
| 2019/0321961 A1 | 10/2019 | Palich et al. |
| 2019/0363649 A1 | 11/2019 | Duan et al. |
| 2020/0055159 A1 * | 2/2020 | Sakai ..................... B24B 47/12 |

FOREIGN PATENT DOCUMENTS

| | | | |
|---|---|---|---|
| DE | 102005024986 A1 | 12/2006 | |
| DE | 102004020421 B4 | 1/2016 | |
| DE | 102017216697 A1 | 3/2019 | |
| DE | 212017000256 U1 | 7/2019 | |
| EP | 1398119 B1 | 4/2010 | |
| EP | 2688080 B1 | 5/2019 | |
| EP | 3663050 A1 * | 6/2020 | ............ B24B 23/02 |
| EP | 3663050 A1 | 6/2020 | |
| JP | 2009106092 A | 5/2009 | |
| JP | 2017229116 A | 12/2017 | |
| JP | 2019118963 A * | 7/2019 | |
| JP | 2019118963 A | 7/2019 | |
| KR | 1020190038124 A | 4/2019 | |

* cited by examiner

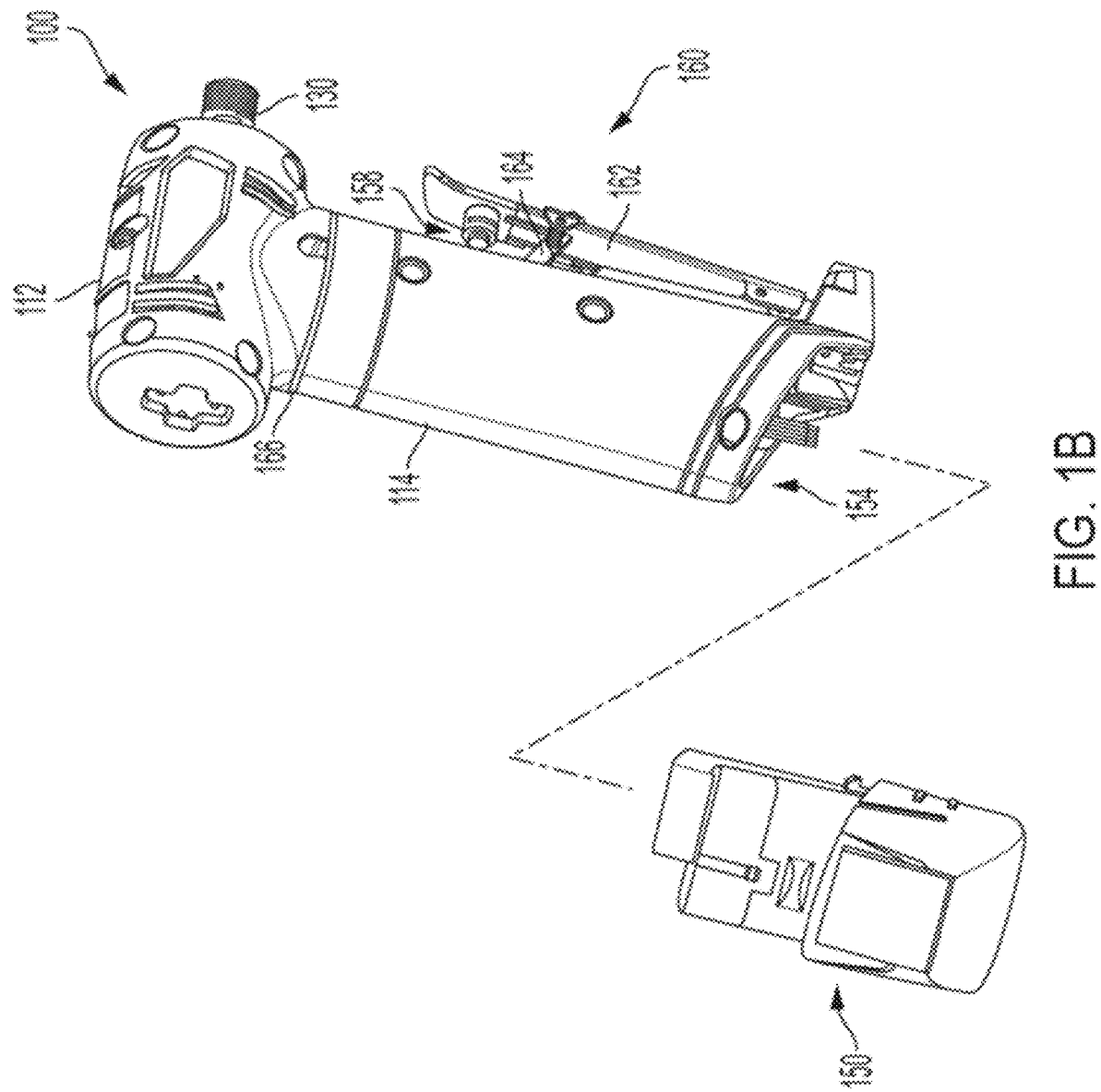

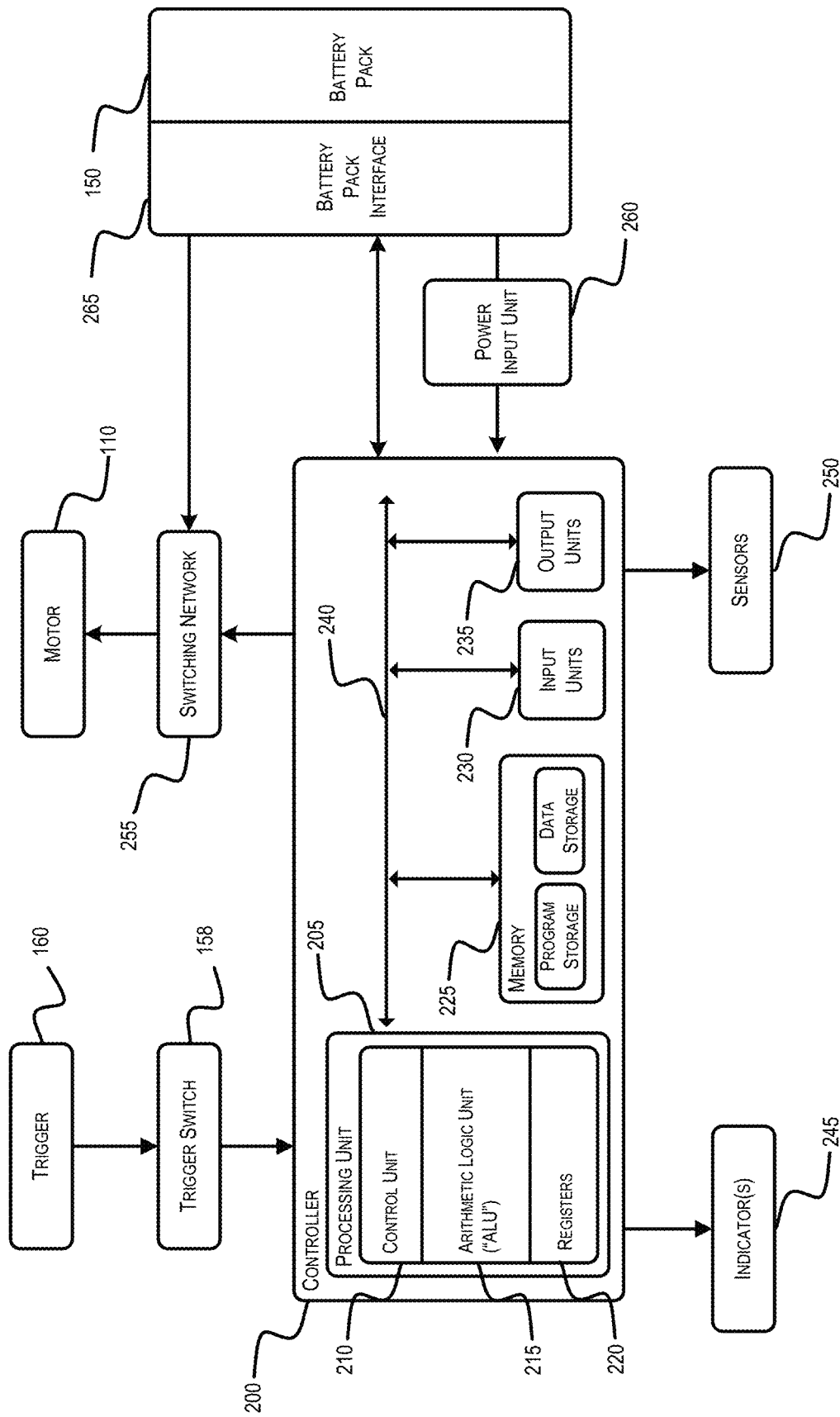

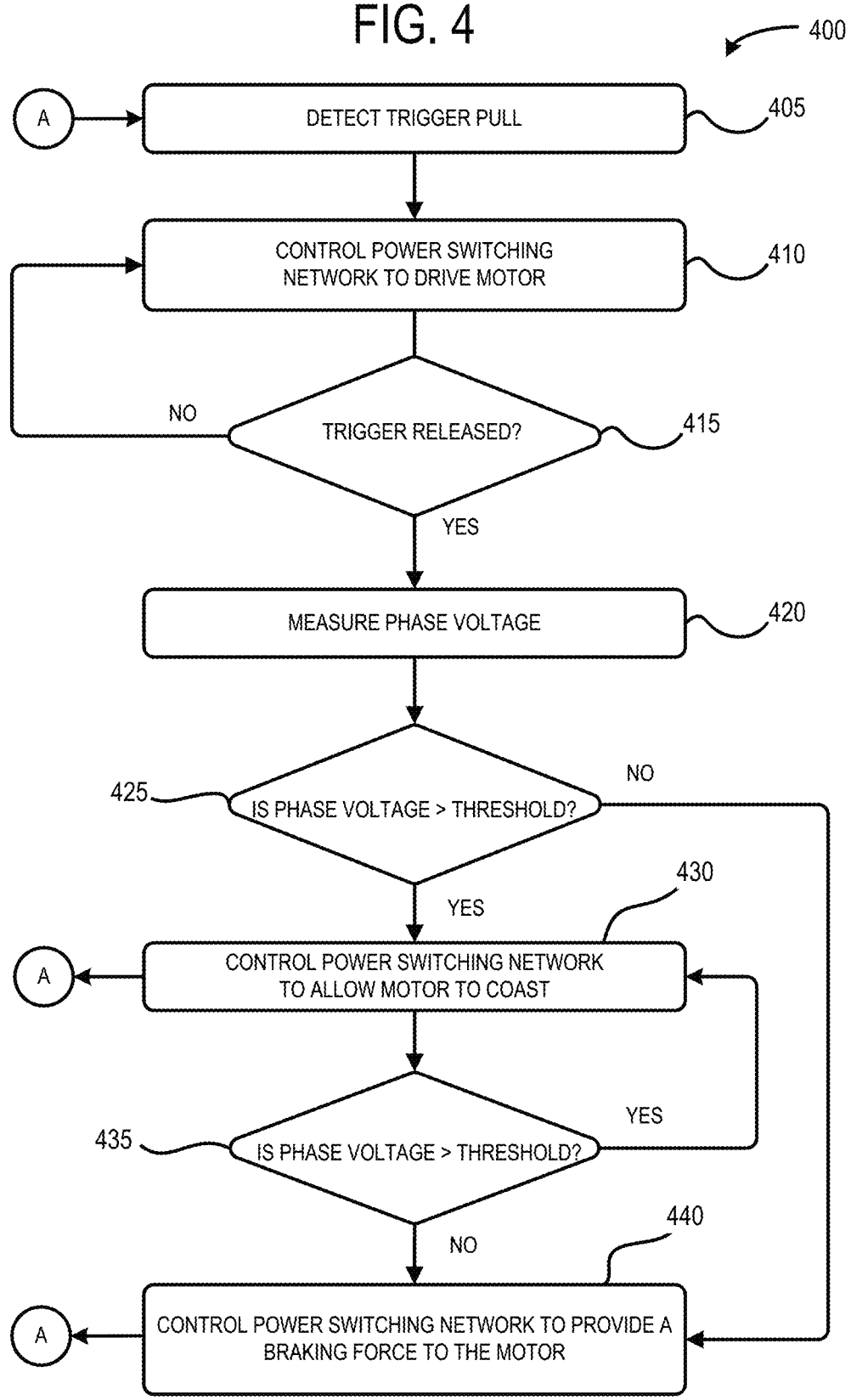

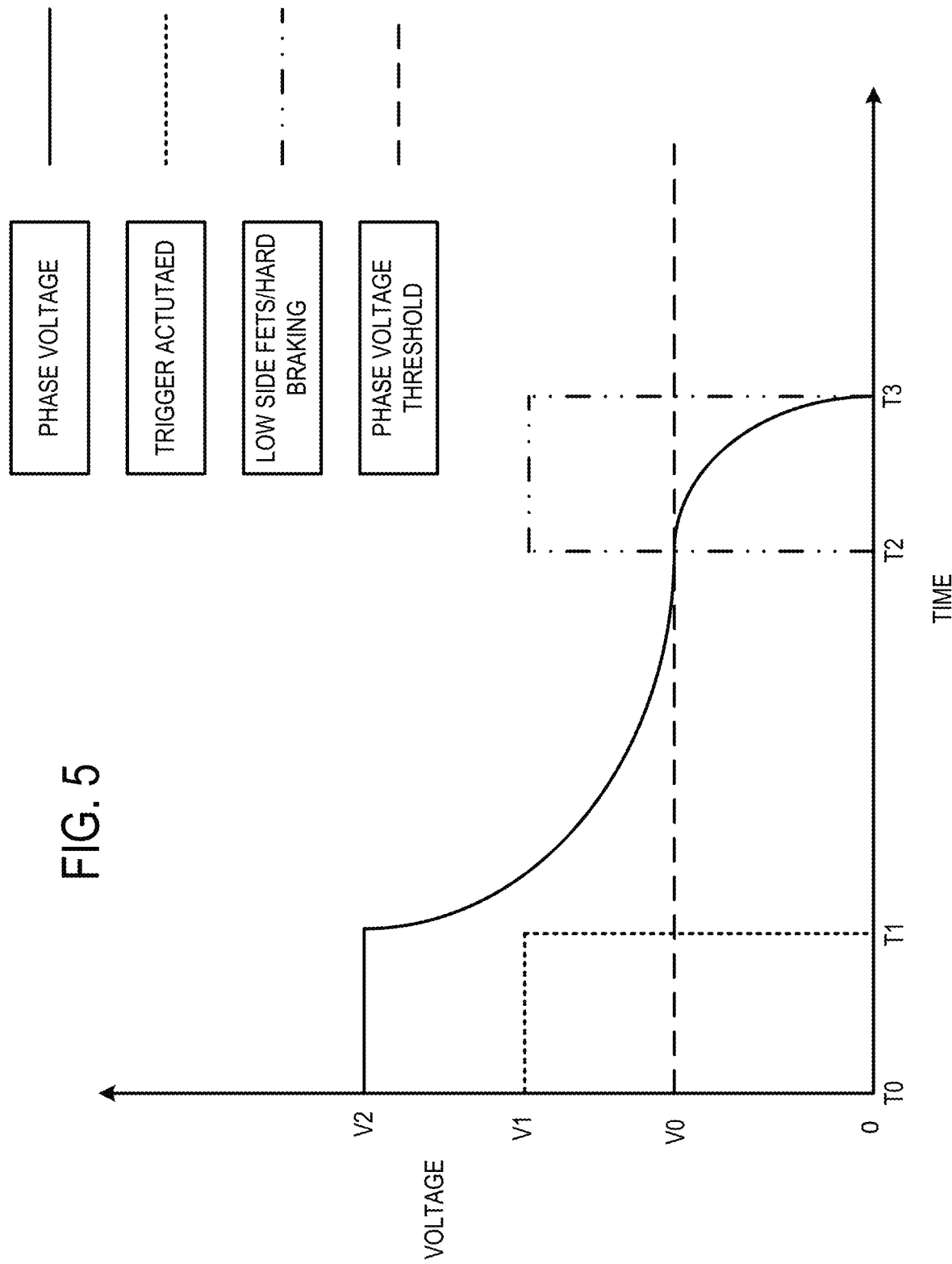

VOLTAGE-BASED BRAKING METHODOLOGY FOR A POWER TOOL

RELATED APPLICATIONS

This application claims the benefit of U.S. Provisional Patent Application No. 63/037,731, filed Jun. 11, 2020, the entire content of which is hereby incorporated by reference.

FIELD

Embodiments described herein provide systems and methods for braking a power tool based on a phase voltage of a motor.

SUMMARY

Power tools described herein include a motor and a power source configured to provide operating power to the motor. A power switching network is between the power source and the motor to drive the motor, the power switching network including a plurality of high side switching elements and a plurality of low side switching elements. An actuator is operable to provide an input. An electronic controller is connected to the actuator and the power switching network. The electronic controller is configured to receive, from the actuator, an indication related to initiating a braking operation of the motor, control the power switching network to allow the motor to coast, monitor a phase voltage of the motor, determine whether the phase voltage of the motor is equal to or less than a phase voltage threshold, and control, in response to determining the phase voltage of the motor is equal to or less than the phase voltage threshold, the power switching network to apply a braking force to the motor.

In some embodiments, controlling the power switching network to allow the motor to coast includes controlling the plurality of high side switching elements and the plurality of low side switching elements to a non-conductive state. In some embodiments, controlling the power switching network to apply the braking force to the motor includes controlling the plurality of low side switching elements to a conductive state. In some embodiments, the power tool further includes a position sensor configured to detect rotation of the motor. In some embodiments, the electronic controller is further configured to determine whether the motor has come to a stop, and control, in response to the motor being at a stopped, the plurality of low side switching elements to a non-conductive state. In some embodiments, the power switching network includes a plurality of pairs of high side switching elements and low side switching elements, and each pair of the plurality of pairs is connected by a phase node. In some embodiments, monitoring the phase voltage of the motor includes monitoring the phase voltage at each phase node. In some embodiments, monitoring the phase voltage of the motor includes monitoring the phase voltage at a single phase node.

Methods described herein for braking a motor in a power tool include receiving an indication at an electronic processor related to initiating a braking operation of the motor, controlling, with the electronic processor, a power switching network to allow the motor to coast, wherein the power switching network includes a plurality of high side switching elements and a plurality of low side switching elements, monitoring, with the electronic processor, a phase voltage of the motor, determining, with the electronic processor, that the phase voltage of the motor is equal to or less than a phase voltage threshold, and controlling, in response to determining that the phase voltage of the motor is equal to or less than the phase voltage threshold, the power switching network to apply a braking force to the motor.

In some embodiments, controlling, with the electronic processor, the power switching network to apply the braking force to the motor includes providing the braking force to the motor until the motor comes to a complete stop. In some embodiments, controlling, with the electronic processor, the power switching network to allow the motor to coast includes controlling the plurality of high side switching elements and the plurality of low side switching elements to a non-conductive state. In some embodiments, controlling the power switching network to apply the braking force to the motor includes controlling the plurality of low side switching elements to a conductive state. In some embodiments, the power switching network includes a plurality of pairs of high side switching elements and low side switching elements, and each pair of the plurality of pairs is connected by a phase node. In some embodiments, monitoring the phase voltage of the motor includes monitoring the phase voltage at each phase node. In some embodiments, monitoring the phase voltage of the motor includes monitoring the phase voltage at a single node.

Another power tool described herein includes a motor and a power source configured to provide operating power to the motor. A power switching network is between the power source and the motor for driving the motor, the power switching network including a plurality of high side switching elements and a plurality of low side switching elements. An actuator is operable to provide an input. An electronic controller is connected to the actuator and the power switching network. The electronic controller is configured to receive, from the actuator, an indication related to initiating a braking operation of the motor, monitor a phase voltage of the motor, and compare the phase voltage of the motor to a phase voltage threshold. The electronic controller is configured to control, in response to the phase voltage of the motor being greater than or equal to the phase voltage threshold, the power switching network to allow the motor to coast. The electronic controller is configured to control, in response to the phase voltage of the motor being less than the phase voltage threshold, the power switching network to apply a braking force to the motor.

In some embodiments, controlling the power switching network to allow the motor to coast includes controlling the plurality of high side switching elements and the plurality of low side switching elements to a non-conductive state. In some embodiments, controlling the power switching network to apply the braking force to the motor includes controlling the plurality of low side switching elements to a conductive state. In some embodiments, the power tool further includes a position sensor configured to detect rotation of the motor. In some embodiments, the electronic controller is further configured to determine whether the motor has come to a stop, and control, in response to the motor being stopped, the plurality of low side switching elements to a non-conductive state. In some embodiments, the indication related to initiating braking of the motor is a transition of the actuator from a pulled position to a released position. In some embodiments, the power tool further includes a forward-reverse selector, and wherein, when the motor is driven in reverse, controlling the power switching network to apply the braking force to the motor includes controlling the plurality of high side switching elements to a conductive state.

Before any embodiments are explained in detail, it is to be understood that the embodiments are not limited in its application to the details of the configuration and arrangement of components set forth in the following description or illustrated in the accompanying drawings. The embodiments are capable of being practiced or of being carried out in various ways. Also, it is to be understood that the phraseology and terminology used herein are for the purpose of description and should not be regarded as limiting. The use of "including," "comprising," or "having" and variations thereof are meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings.

In addition, it should be understood that embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiments, the electronic-based aspects may be implemented in software (e.g., stored on non-transitory computer-readable medium) executable by one or more processing units, such as a microprocessor and/or application specific integrated circuits ("ASICs"). As such, it should be noted that a plurality of hardware and software based devices, as well as a plurality of different structural components, may be utilized to implement the embodiments. For example, "servers" and "computing devices" described in the specification can include one or more processing units, one or more computer-readable medium modules, one or more input/output interfaces, and various connections (e.g., a system bus) connecting the components.

Other features and aspects will become apparent by consideration of the following detailed description and accompanying drawings.

BRIEF DESCRIPTION OF THE DRAWINGS

FIGS. 1A-1B are perspective views of a power tool in accordance with embodiments described herein.

FIG. 2 illustrates a block circuit diagram for a controller of the power tool of FIGS. 1A-1C in accordance with embodiments described herein.

FIG. 4 illustrates a block diagram of a method performed by the controller of FIG. 2 in accordance with an embodiment described herein.

FIG. 5 illustrates a graph of the method of FIG. 4 in accordance with embodiments described herein.

DETAILED DESCRIPTION

Figure 1A:
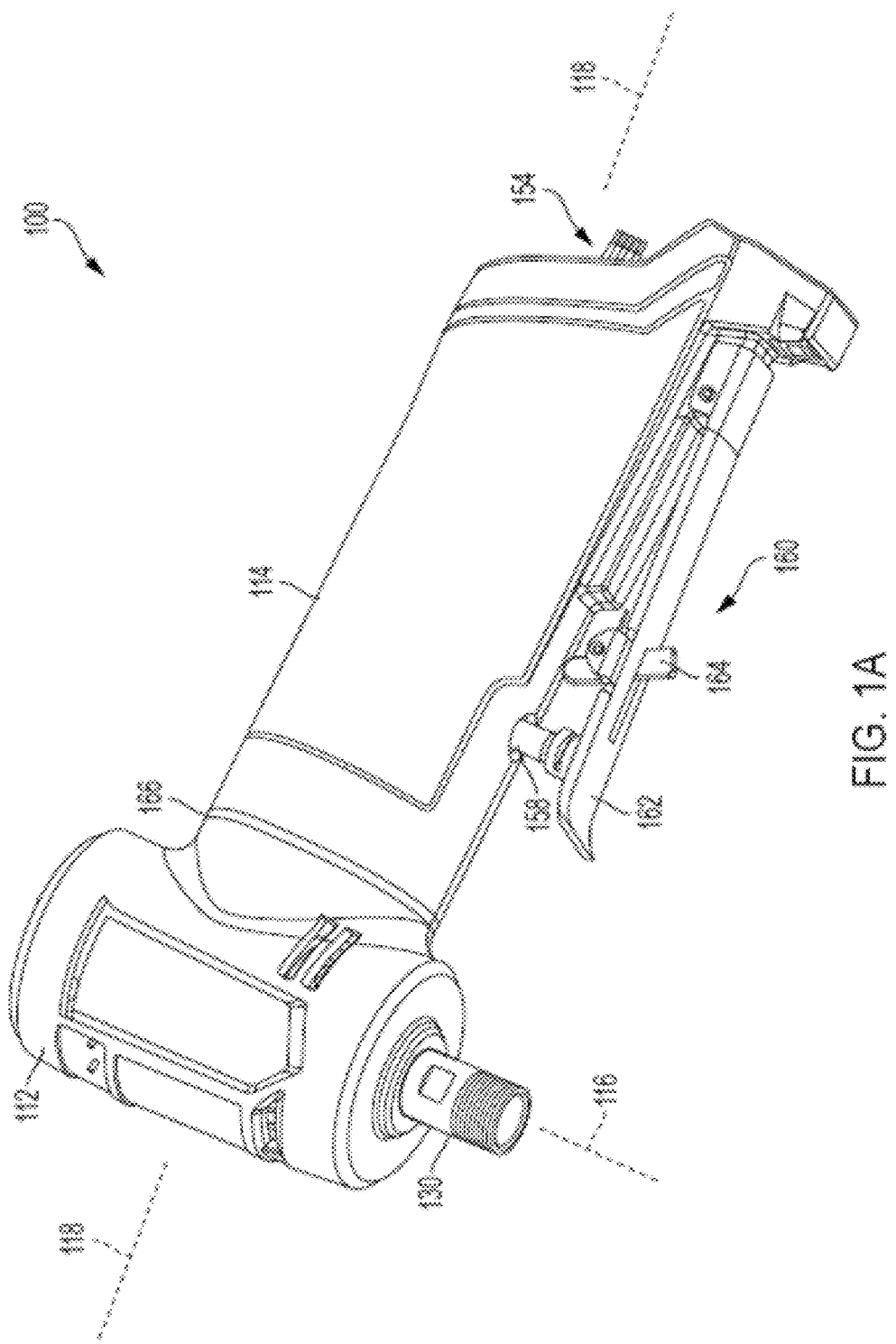
Figure 1C:
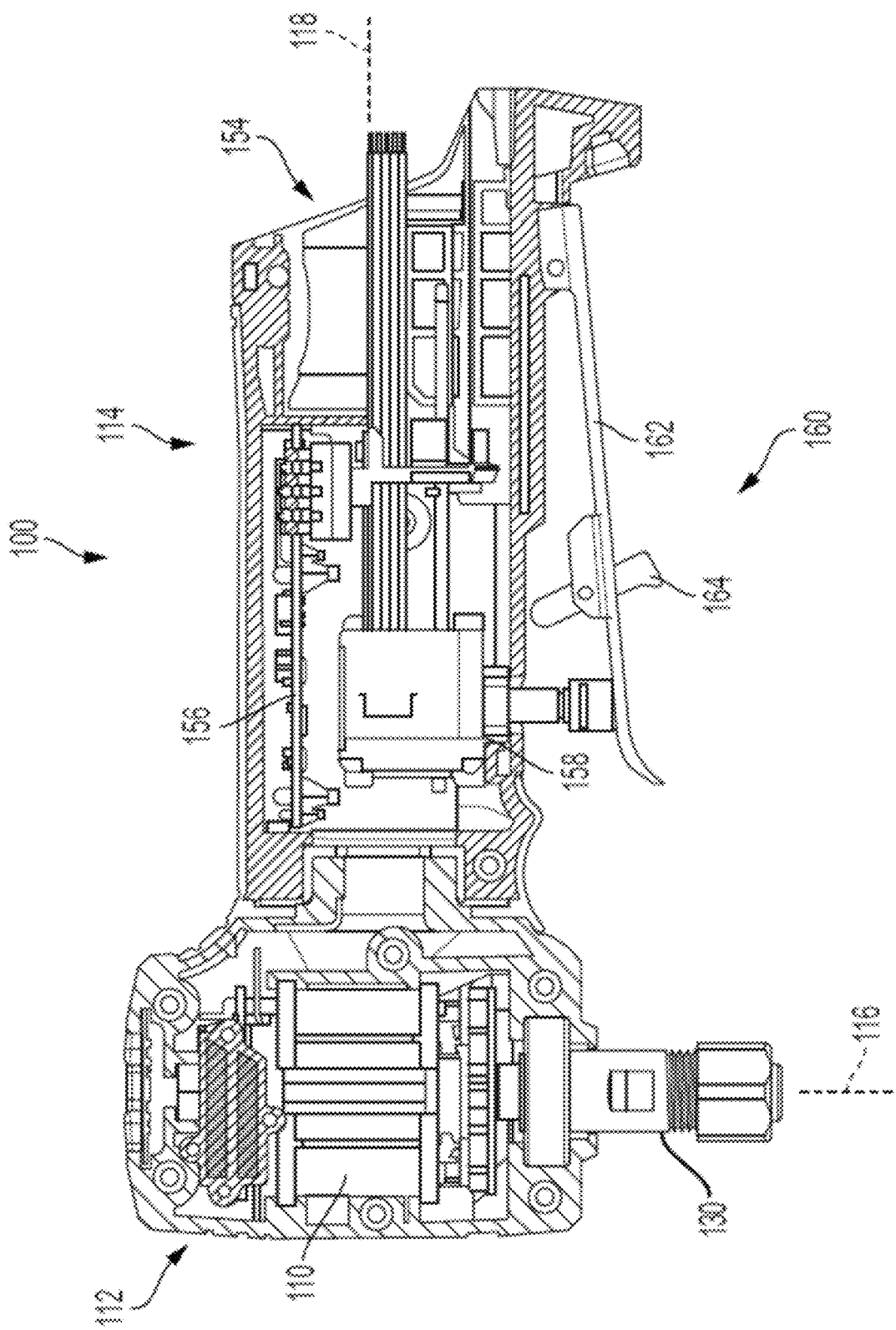
FIG. 1C is a cross-sectional view of the power tool of FIGS. 1A-1B in accordance with embodiments described herein.

FIGS. 1A-1C illustrate a portable power tool 100. One example of the power tool 100 is an angle grinder, as shown in FIGS. 1A-1C. The power tool 100 may include a motor housing 112 and a handle 114 that extends transversely from the motor housing 112. The motor housing 112 extends along a first axis 116 (e.g., a motor axis), and the handle 114 extends along a second axis 118 that is transverse to the first axis 116. A motor 110 (see FIG. 1C) is located within the motor housing 112. The first axis 116 is defined by a rotor shaft of the motor 110, which extends longitudinally through the motor housing 112. In some embodiments, the power tool 100 is an inline grinder, rather than an angle grinder, wherein the first axis 116 of the motor housing 112 is generally parallel or coaxial with the second axis 118 of the handle 114.

The motor 110 also includes a rotor and a stator that surrounds the rotor. In some embodiments, the motor 110 is a brushless direct current (DC) motor in which the rotor is a permanent magnet motor and the stator includes coil windings that are selectively energized to drive the rotor. In other embodiments, the motor 110 is a brushed motor. The stator is supported within the motor housing 112 and remains stationary relative to the motor housing 112 during operation of the power tool 100. The rotor is rotatably fixed to a rotor shaft and configured to co-rotate with the rotor shaft, relative to the stator, about the first axis 116. A portion of the rotor shaft defines an output shaft 130 extending from the motor housing 112. The output shaft 130 is coupleable to a tool holder (not shown) that may be configured to receive an accessory, such as a cutting tool, a grinding disc, a rotary burr, a sanding disc, etc. Various types of accessories may be interchangeably attached to the tool holder and may be designed with different characteristics to perform different types of operations. For example, an accessory may be made of a material and have dimensions suitable for performing a specific type of task. The characteristics of an accessory may affect the performance of the power tool 100 or may impose constraints on operation of the tool. For example, different accessory types may be configured to work at different rotational speeds or applied torque depending on the characteristics of the accessory and the task at hand. During operation of the power tool 100, the rotor shaft, and thus the output shaft 130, may rotate at speeds above 20,000 rpm (e.g., 24,500 rpm).

Figure 3:
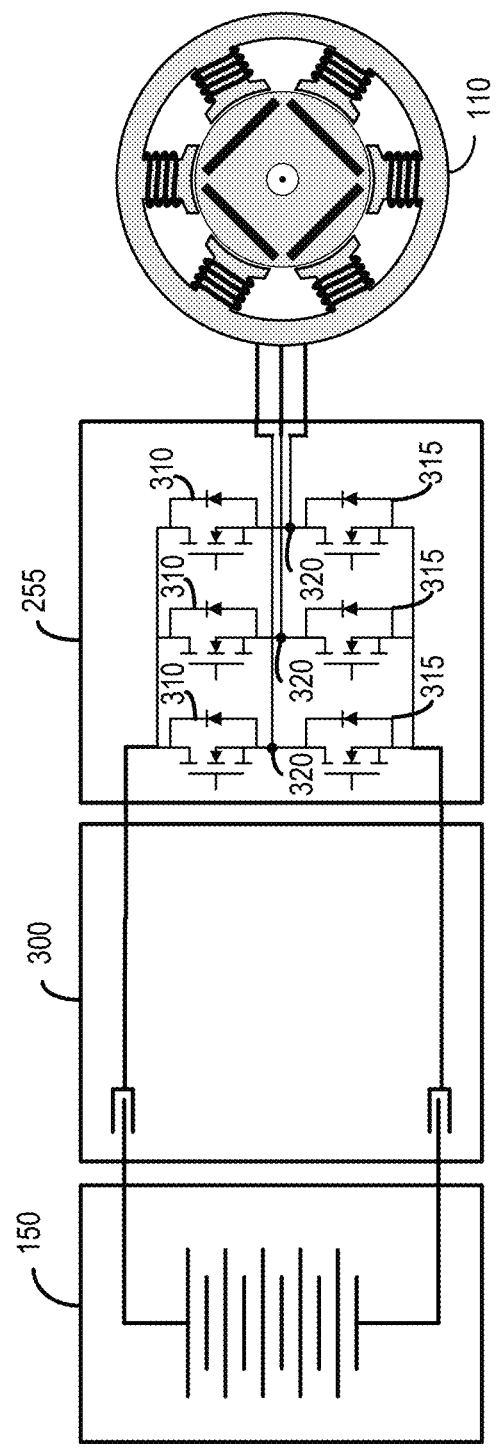
FIG. 3 illustrates a block diagram of a power switching network and a braking circuit of the power tool of FIGS. 1A-1C in accordance with embodiments described herein.

In some embodiments, the handle 114 includes a power supply 150 (see FIG. 1B). For example, the handle 114 may define a battery receptacle 154, which is positioned on an end of the handle 114 opposite the motor housing 112. The battery receptacle 154 is configured to selectively, mechanically, and electrically connect to the power supply 150 (e.g., a rechargeable battery pack 150) for powering the motor 110. The battery pack 150 is insertable into the battery receptacle 154 such that, when inserted, the battery pack 150 is oriented along the second axis 118. Alternatively, in another embodiment of the power tool 100, the battery pack 150 may be slidably coupled to a battery receptacle 154 along an axis that is transverse to the second axis 118. The battery pack 150 may include any of a number of different nominal voltages (e.g., 12V, 18V, etc.) and may be configured having any of a number of different chemistries (e.g., lithium-ion, nickel-cadmium, etc.). In alternative embodiments (not shown), the motor 110 may be powered by a remote power supply 150 (e.g., a household electrical outlet) through a power cord and a power interface 300 (as shown in FIG. 3) of the power tool 100. The handle 114 further contains control electronics 156 for the power tool 100, which include controller 200 (see FIG. 2).

The handle 114 supports a trigger or trigger assembly 160 (e.g., an actuator) operable to selectively electrically connect the power source 150 (e.g., the battery pack 150) and the motor 110. The trigger assembly 160 may be a "lock-off" trigger assembly having a paddle member 162 and a lock-off member 164 supported by the paddle member 162. The paddle member 162 is operable to actuate a trigger switch 158 (e.g., a microswitch) to selectively activate and deactivate the motor 110 during operation of the power tool 100. The lock-off member 164 selectively prevents operation of the paddle member 162. Specifically, the lock-off member 164 is pivotable to selectively lock and unlock the paddle member 162. The speed of the motor 110 may be controlled by varying the level of depression of the paddle member 162.

In some embodiments, the power tool 100 includes a vibration damping assembly 166 positioned between the motor housing 112 and the handle 114 to attenuate vibration from the motor housing 112. The damping assembly may include a first coupling portion defined by the motor housing 112, a second coupling portion defined by the handle 114, and an elastomeric damper positioned between the first and second coupling portions.

The controller 200 for the power tool 100 is illustrated in FIG. 2. The controller 200 is electrically and/or communicatively connected to a variety of modules or components of the power tool 100. For example, the illustrated controller 200 is connected to indicator(s) 245, sensors 450 (which may include, for example, a speed sensor, a current sensor, a voltage sensor, a position sensor, etc.), the trigger 160 (via the trigger switch 158), a power switching network 255, and a power input unit 260.

The controller 200 includes a plurality of electrical and electronic components that provide power, operational control, and protection to the components and modules within the controller 200 and/or power tool 100. For example, the controller 200 includes, among other things, a processing unit 205 (e.g., a microprocessor, an electronic processor, an electronic controller, a microcontroller, or another suitable programmable device), a memory 225, input units 230, and output units 235. The processing unit 205 includes, among other things, a control unit 210, an arithmetic logic unit ("ALU") 215, and a plurality of registers 220 (shown as a group of registers in FIG. 2), and is implemented using a known computer architecture (e.g., a modified Harvard architecture, a von Neumann architecture, etc.). The processing unit 205, the memory 225, the input units 230, and the output units 235, as well as the various modules connected to the controller 200 are connected by one or more control and/or data buses (e.g., common bus 240). The control and/or data buses are shown generally in FIG. 2 for illustrative purposes. The use of one or more control and/or data buses for the interconnection between and communication among the various modules and components would be known to a person skilled in the art in view of the embodiments described herein.

The memory 225 is a non-transitory computer readable medium and includes, for example, a program storage area and a data storage area. The program storage area and the data storage area can include combinations of different types of memory, such as a ROM, a RAM (e.g., DRAM, SDRAM, etc.), EEPROM, flash memory, a hard disk, an SD card, or other suitable magnetic, optical, physical, or electronic memory devices. The processing unit 205 is connected to the memory 225 and executes software instruction that are capable of being stored in a RAM of the memory 225 (e.g., during execution), a ROM of the memory 225 (e.g., on a generally permanent basis), or another non-transitory computer readable medium such as another memory or a disc. Software included in the implementation of the power tool 100 can be stored in the memory 225 of the controller 200. The software includes, for example, firmware, one or more applications, program data, filters, rules, one or more program modules, and other executable instructions. The controller 200 is configured to retrieve from the memory 225 and execute, among other things, instructions related to the control processes and methods described herein. In other embodiments, the controller 200 includes additional, fewer, or different components.

In some embodiments, as described above, the power tool 100 is an angle grinder. The controller 200 drives the motor 110 to rotate the output shaft 130 in response to a user's actuation of the trigger 160. Depression of the trigger 160 actuates a trigger switch 158, which outputs a signal to the controller 200 to drive the output shaft 130. The controller 200 controls a power switching network 255 (e.g., a FET switching bridge) to drive the motor 110. When the trigger 160 is released, the trigger switch 158 no longer outputs the actuation signal (or outputs a released signal) to the controller 200. As detailed below with respect to FIG. 4, when the trigger 160 is released, the controller 200 controls the power switching network 255 to brake the motor 110 by allowing the motor 110 to freely coast prior to applying a braking force.

The indicators 245 are also connected to the controller 200 and receive control signals from the controller 200 to turn on and off or otherwise convey information based on different states of the power tool 100. The indicators 245 include, for example, one or more light-emitting diodes (LEDs), or a display screen. The indicators 245 can be configured to display conditions of, or information associated with, the power tool 100. For example, the indicators 245 can display information relating to the charging state of the power tool 100, such as the charging capacity. The indicators 245 may also display information relating to a fault condition, or other abnormality, of the power tool 100. In addition to or in place of visual indicators, the indicators 245 may also include a speaker or a tactile feedback mechanism to convey information to a user through audible or tactile outputs.

The battery pack interface 265 is connected to the controller 200 and is configured to couple to a battery pack 150 (e.g., using the battery receptacle 154). The battery pack interface 265 includes a combination of mechanical (e.g., a battery pack receiving portion) and electrical components configured to and operable for interfacing (e.g., mechanically, electrically, and communicatively connecting) the power tool 100 with the battery pack 150. The battery pack interface 265 is coupled to the power input unit 260. The battery pack interface 265 transmits the power received from the battery pack 150 to the power input unit 260. The power input unit 260 includes active and/or passive components (e.g., voltage step-down controllers, voltage converters, rectifiers, filters, etc.) to regulate or control the power received through the battery pack interface 265 and to the controller 200. In some embodiments, the battery pack interface 265 is also coupled to the power switching network 255. The operation of the power switching network 255, as controlled by the controller 200, determines how power is supplied to the motor 110.

FIG. 3 illustrates a circuit diagram of the power switching network 255 according to some embodiments. The power switching network 255 includes a plurality of high side switching elements 310 (e.g., field effect transistors [FETs]) and a plurality of low side switching elements 315 (e.g., FETs). Each high side FET 310 and low side FET 315 pair is connected by a phase node 320. The controller 200 provides the control signals to control the high side FETs 310 and the low side FETs 315 to drive the motor 110 based on user controls, as described above. For example, in response to detecting a pull of the trigger 160, the controller 200 provides the control signals to selectively enable and disable the high side FETs 310 and the low side FETs 315 (e.g., sequentially, in pairs) resulting in power from the battery pack 150 to be selectively applied to stator coils of the motor 110 to cause rotation of a rotor. The rotor may be driven in a first direction (e.g., a clockwise direction) or a second direction (e.g., a counter-clockwise direction) based on an additional input, such as a forward/reverse selector. More particularly, to drive the motor 110, the controller 200 enables a first high side FET 310 and a first low side FET 315 pair (e.g., by providing a voltage at a gate terminal of the FETs) for a first period of time. As the rotor of the motor 110 rotates, a position sensor may detect rotation of the motor 110, such as detecting the position of a specific phase, causing the controller 200 to disable the first FET pair, and enable a second high side FET 310 and a second low side FET 315. In response to detecting further rotation, the controller 200 disables the second FET pair and enables a third high side FET 310 and a third low side FET 315. This sequence of cyclically enabling pairs of high side FET 310 and low side FET 315 repeats to drive the motor 110.

In the example illustrated in FIG. 3, the power tool 100 includes a straight connect power interface 300, or a connection between the battery pack 150 and the power switching network 255. In some embodiments, the straight connect power interface 300 includes a mechanical on/off switch that is controlled by the trigger 160 of the power tool 100. The mechanical switch may be, for example, a relay or a solid state drive switch coupled on the current path between the battery pack 150 and the power switching network 255. The mechanical switch is used to enable or disable power from the battery pack 150 to the power switching network 255 and is controlled mechanically by the trigger 160. In some embodiments, rather than using a mechanical switch mechanically controlled by the trigger 160, the straight connect power interface 300 may include a power FET controlled by the controller 200 to selectively connect and disconnect the battery pack 150 to the power switching network 255 (e.g., based on a trigger pull).

To stop the motor 110, the controller 200 controls the power switching network 255 to first allow the motor 110 to freely coast before applying a braking force. For example, FIG. 4 is a flowchart of an example method 400 for braking the motor 110 of the power tool 100. The method 400 may be performed by the controller 200. At block 405, the method 400 includes detecting, using the controller 200, a trigger pull. When the trigger 160 is pulled (e.g., pressed, pushed, or the like), the controller 200 receives an input from the trigger switch 158 indicating that the trigger 160 is pulled. In some embodiments, a trigger sensor (e.g., a push button switch, a Hall effect sensor, a potentiometer, a force sensor, etc.) may detect depression of trigger 160 and output a signal indicative of the pull state (e.g., pulled or not pulled) to the controller 200. FIG. 5, for example, illustrates a graph of the operation of controller 200. At time t0, the controller 200 detects a pull (or actuation) of the trigger 160 (shown by value V1). In some embodiments, the controller 200 receives an input indicating the distance to which the trigger 160 is pulled. The distance the trigger 160 is pulled may indicate a desired speed for variable speed control of the motor 110.

At block 410, the method 400 includes controlling, using the controller 200, the power switching network 255 to drive the motor 110. For example, as described above, the controller 200 selects high side FET 310 and low side FET 315 pairs to drive the motor 110. At block 415, the method 400 includes determining, with the controller 200, whether the trigger 160 is released. If the trigger 160 is not released, the method 400 returns to block 410. If the trigger 160 is released, the method 400 determines to initiate braking of the motor 110 and continues to block 420. In some embodiments, when the trigger 160 is released, the controller 200 receives, from the trigger 160, an indication to initiate braking of the motor 110, such as a signal from the trigger switch 158. For example, FIG. 5 shows the trigger 160 being released at time t1.

At block 420, the method 400 includes monitoring (or measuring), with the controller 200, the phase voltage supplied to the motor 110. For example, in FIG. 5, at time t1, the controller 200 measures a phase voltage of V2 supplied to the motor 110. The controller 200 may monitor the phase voltage at each phase node 320. In some embodiments, the controller 200 measures only a single phase node 320 of the power switching network 255. In other embodiments, the controller 200 measures the voltage of each phase node 320 (e.g., three phase nodes) of the power switching network 255. In some embodiments, the controller 200 continuously monitors the phase voltage supplied to the motor 110. For example, the controller 200 may monitor the phase voltage supplied to the motor 110 while the trigger 160 is pulled (at time t0).

At block 425, the method 400 includes comparing, in response to the trigger 160 being released, the measured phase voltage at the phase node 320 to a phase voltage threshold. For example, in FIG. 5, the trigger 160 is released at time t1. The phase voltage at time t1 is V2, which is greater than the phase voltage threshold (V0). If the phase voltage of the motor 110 is above the phase voltage threshold, the method 400 proceeds to block 430. If the phase voltage of the motor 110 is below the phase voltage threshold, the method 400 proceeds to block 440.

At block 430, the method 400 includes controlling, with the controller 200, the power switching network 255 to coast the motor 110. For example, the controller 200 may control the high side FETs 310 and the low side FETs 315 to a non-conductive state such that no current is supplied to the motor 110. While coasting, the motor 110 may experience a resistive force due to friction. For example, in FIG. 5, the phase voltage, which is related to the back emf generated by the motor 110 as it coasts, decreases between t1 to t2. The reduction in phase voltage is associated with the speed of the motor 110 being reduced due to frictional forces. The phase voltage of the motor 110 is continuously compared to the phase threshold, as shown at block 435. Accordingly, the controller 200 continues to allow the motor 110 to freely coast for the duration of time that the phase voltage of the motor 110 remains above the phase threshold.

If, at block 435, the phase voltage of the motor 110 is equal to or below the phase threshold, the method 400 proceeds to block 440, which includes controlling, with the controller 200, the power switching network 255 to provide a braking force (e.g., a hard braking force) to the motor 110. For example, if the motor 110 is rotating in the first direction (e.g., clockwise), the controller 200 may control the low side FETs 315 to a conductive state, providing a back-emf current to the motor 110. The controller 200 may place the low side FETs 315 in the conductive state until the motor 110 comes to a stop, as detected by the position sensor. In some embodiments, if the motor 110 is rotating in the second direction (e.g., counter-clockwise), the controller 200 may control the high side FETs 310 to a conductive state. FIG. 5, for example, illustrates the controller 200 initiating the low side FETs 315 to a conductive state at time t2. The low side FETs 315 remain in the conductive state until time t3.

During this time, the motor 110 brakes much more quickly than when the motor 110 was simply coasting, due to the provided braking force.

Once braking is complete, the controller 200 may place the low side FETs 315 (or the high side FETs 310) back in the non-conductive state. Should the trigger 160 be pulled again, the method 400 returns to block 405. In some embodiments, the trigger 160 may be pulled while the controller 200 performs the braking action. For example, at block 430, while the motor 110 is coasting, the controller 200 may receive an input indicative of a trigger pull. When the controller 200 receives the input, it returns to block 405, and the method 400 starts over. Although block 430 is provided as an example, this may occur at any point during the method 400. In some embodiments, the trigger 160 being pulled during coasting or hard braking is ignored by the controller 200 until the motor 110 has come to a complete stop.

Thus, embodiments provided herein describe, among other things, systems and methods for braking a power tool based on the phase voltage. Various features and advantages are set forth in the following claims.

What is claimed is:

1. A power tool comprising:
a motor;
a power source configured to provide operating power to the motor;
a power switching network between the power source and the motor and configured to drive the motor, the power switching network including a plurality of high side switching elements and a plurality of low side switching elements;
an actuator operable to output a signal; and
an electronic controller connected to the actuator and the power switching network, the electronic controller configured to:
control, in response to the signal, the power switching network to drive the motor,
receive, from the actuator, an indication related to initiating a braking operation of the motor,
control the power switching network to allow the motor to coast,
monitor a phase voltage of the motor,
determine whether the phase voltage of the motor is equal to or less than a phase voltage threshold,
control, in response to determining the phase voltage of the motor is equal to or less than the phase voltage threshold, the power switching network to apply a braking force to the motor, and
ignore, while applying the braking force to the motor, subsequent signals from the actuator.

2. The power tool of claim 1, wherein, to control the power switching network to allow the motor to coast, the electronic controller is further configured to control the plurality of high side switching elements and the plurality of low side switching elements to a non-conductive state.

3. The power tool of claim 1, wherein, to control the power switching network to apply the braking force to the motor, the electronic controller is further configured to control the plurality of low side switching elements to a conductive state.

4. The power tool of claim 3, further comprising a position sensor configured to detect rotation of the motor, and wherein the electronic controller is further configured to:
determine whether the motor has come to a stop, and
control, in response to the motor being stopped, the plurality of low side switching elements to a non-conductive state.

5. The power tool of claim 1, wherein:
the power switching network includes a plurality of pairs of high side switching elements and low side switching elements; and
each pair of the plurality of pairs is connected by a phase node.

6. The power tool of claim 5, wherein, to monitor the phase voltage of the motor, the electronic controller is further configured to monitor the phase voltage at each phase node.

7. The power tool of claim 5, wherein, to monitor the phase voltage of the motor, the electronic controller is further configured to monitor the phase voltage at at least one phase node.

8. A method for braking a motor in a power tool, the method comprising:
controlling, in response to a signal from an actuator and with an electronic processor, a power switching network to drive the motor;
receiving, with the electronic processor, an indication related to initiating a braking operation of the motor;
controlling, with the electronic processor, a power switching network to allow the motor to coast, wherein the power switching network includes a plurality of high side switching elements and a plurality of low side switching elements;
monitoring, with the electronic processor, a phase voltage of the motor;
determining, with the electronic processor, that the phase voltage of the motor is equal to or less than a phase voltage threshold;
controlling, in response to determining that the phase voltage of the motor is equal to or less than the phase voltage threshold, the power switching network to apply a braking force to the motor, and
ignoring, while applying the braking force to the motor, subsequent signals from the actuator.

9. The method of claim 8, wherein controlling, with the electronic processor, the power switching network to apply the braking force to the motor includes providing the braking force to the motor until the motor comes to a complete stop.

10. The method of claim 8, wherein controlling, with the electronic processor, the power switching network to allow the motor to coast includes controlling the plurality of high side switching elements and the plurality of low side switching elements to a non-conductive state.

11. The method of claim 8, wherein controlling the power switching network to apply the braking force to the motor includes controlling the plurality of low side switching elements to a conductive state.

12. The method of claim 8, wherein:
the power switching network includes a plurality of pairs of high side switching elements and low side switching elements; and
each pair of the plurality of pairs is connected by a phase node.

13. The method of claim 12, wherein monitoring the phase voltage of the motor includes monitoring the phase voltage at each phase node.

14. The method of claim 12, wherein monitoring the phase voltage of the motor includes monitoring the phase voltage at at least one node.

15. A power tool comprising:
a motor;
a power source configured to provide operating power to the motor;
a power switching network between the power source and the motor and configured to drive the motor, wherein the power switching network includes a plurality of high side switching elements and a plurality of low side switching elements;
an actuator operable to output a signal; and
an electronic controller connected to the actuator and the power switching network, the electronic controller configured to:
 control, in response to the signal, the power switching network to drive the motor,
 receive, from the actuator, an indication related to initiating a braking operation of the motor,
 monitor a phase voltage of the motor,
 compare the phase voltage of the motor to a phase voltage threshold,
 control, in response to the phase voltage of the motor being greater than or equal to the phase voltage threshold, the power switching network to allow the motor to coast,
 control, in response to the phase voltage of the motor being less than the phase voltage threshold, the power switching network to apply a braking force to the motor, and
 ignore, while applying the braking force to the motor, subsequent signals from the actuator.

16. The power tool of claim 15, wherein, to control the power switching network to allow the motor to coast, the electronic controller is further configured to control the plurality of high side switching elements and the plurality of low side switching elements to a non-conductive state.

17. The power tool of claim 15, wherein, to control the power switching network to apply the braking force to the motor, the electronic controller is further configured to control the plurality of low side switching elements to a conductive state.

18. The power tool of claim 17, further comprising a position sensor configured to detect rotation of the motor, and wherein the electronic controller is further configured to:
 determine whether the motor has come to a stop, and
 control, in response to the motor being stopped, the plurality of low side switching elements to a non-conductive state.

19. The power tool of claim 15, wherein the indication related to initiating a braking operation of the motor is a transition of the actuator from a pulled position to a released position.

20. The power tool of claim 15, further comprising a forward-reverse selector, and wherein, when the motor is driven in reverse, to control the power switching network to apply the braking force to the motor, the electronic controller is further configured to control the plurality of high side switching elements to a conductive state.

* * * * *